United States Patent
Kataoka (10) Patent No.: US 10,981,271 B2
(45) Date of Patent: Apr. 20, 2021

(54) ROBOT AND GEAR DEVICE

(71) Applicant: Seiko Epson Corporation, Tokyo (JP)

(72) Inventor: Yuya Kataoka, Chino (JP)

(73) Assignee: Seiko Epson Corporation

( * ) Notice: Subject to any disclaimer, the term of this patent is extended or adjusted under 35 U.S.C. 154(b) by 157 days.

(21) Appl. No.: 16/274,588

(22) Filed: Feb. 13, 2019

(65) Prior Publication Data

US 2019/0247999 A1 Aug. 15, 2019

(30) Foreign Application Priority Data

Feb. 14, 2018 (JP) .............................. JP2018-023780

(51) Int. Cl.
| | |
|---|---|
| *F16H 49/00* | (2006.01) |
| *F16H 55/08* | (2006.01) |
| *B25J 9/10* | (2006.01) |
| *F16C 27/06* | (2006.01) |

(52) U.S. Cl.
CPC ........... *B25J 9/1025* (2013.01); *F16C 27/066* (2013.01); *F16H 49/001* (2013.01); *F16H 55/0833* (2013.01); *F16C 2322/59* (2013.01); *F16C 2361/61* (2013.01)

(58) Field of Classification Search
CPC .................................................. F16H 49/001
USPC ......................................................... 74/640
See application file for complete search history.

(56) References Cited

U.S. PATENT DOCUMENTS

| | | | | |
|---|---|---|---|---|
| 3,187,605 A | * | 6/1965 | Stiff ....................... | F16H 49/001 74/640 |
| 3,747,434 A | * | 7/1973 | Stahlhuth .............. | F16H 49/001 74/640 |
| 4,491,033 A | * | 1/1985 | Carlson ................. | F16H 49/001 74/640 |
| 7,530,292 B2 | * | 5/2009 | Ishikawa ............. | F16H 55/0833 74/640 |
| 2012/0304791 A1 | | 12/2012 | Ishikawa | |

FOREIGN PATENT DOCUMENTS

JP      2012-251588 A      12/2012

* cited by examiner

*Primary Examiner* — Ha Dinh Ho
(74) *Attorney, Agent, or Firm* — Harness, Dickey & Pierce, P.L.C.

(57) ABSTRACT

A gear device includes an internal gear, an external gear partially meshing with the internal gear, relatively rotating around a rotation axis to the internal gear, and having flexibility, and a wave generator being in contact with an inner circumferential surface of the external gear and moving a meshing position of the internal gear and the external gear in a circumferential direction about the rotation axis, wherein a virtual straight line as an extension of a tooth trace of the internal gear intersects with the rotation axis in a sectional view cut along a plane containing the rotation axis.

6 Claims, 8 Drawing Sheets

ROBOT AND GEAR DEVICE

BACKGROUND

1. Technical Field

The present invention relates to a robot and gear device.

2. Related Art

In a robot having a robot arm including at least one arm, for example, a joint part of the robot arm is driven by a motor and, generally, the rotation by the drive power from the motor is decelerated by a gear device (reducer). As the gear device, e.g. a wave gear device as disclosed in Patent Document 1 (JP-A-2012-251588) is known.

A wave gear device described in Patent Document 1 has an annular rigid internal gear, a flexible external gear provided inside of the rigid internal gear, and an elliptically contoured wave generator fitted inside of the flexible external gear. Here, the rigid internal gear and the flexible external gear have a difference in number of teeth, and the flexible external gear is flexed in an elliptical shape by the wave generator and meshes with the rigid internal gear in parts on both ends of the elliptical shape in the long axis directions. When the wave generator is rotated, the meshing positions of the rigid internal gear and the flexible external gear move in a circumferential direction and the rigid internal gear and the flexible external gear relatively rotate according to the difference in number of teeth.

In the wave gear device described in Patent Document 1, the respective tooth trace directions of the rigid internal gear and the flexible external gear are parallel to the rotation axes of the gears and the tooth contact strength between the gears or the like is determined only by the dimensional accuracy of the gears and the wave generator. Accordingly, in the wave gear device described in Patent Document 1, the higher dimensional accuracy is required for the gears and the wave generator and, as a result, there is a problem that the cost reduction of the wave gear device is difficult.

SUMMARY

A robot according to an application example of the invention includes a first member, a second member that rotates relative to the first member, and a gear device that transmits drive power for rotating the second member relative to the first member from one side to the other side of the first member and the second member, the gear device has an internal gear, an external gear partially meshing with the internal gear, relatively rotating around a rotation axis to the internal gear, and having flexibility, and a wave generator being in contact with an inner circumferential surface of the external gear and moving a meshing position of the internal gear and the external gear in a circumferential direction about the rotation axis, wherein one of the internal gear, the external gear, and the wave generator is connected to the first member and another one is connected to the second member, and a virtual straight line as an extension of a tooth trace of the internal gear intersects with the rotation axis in a sectional view cut along a plane containing the rotation axis.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot and gear device according to the invention will be explained in detail based on embodiments shown in the accompanying drawings.

1. Robot

Figure 1:
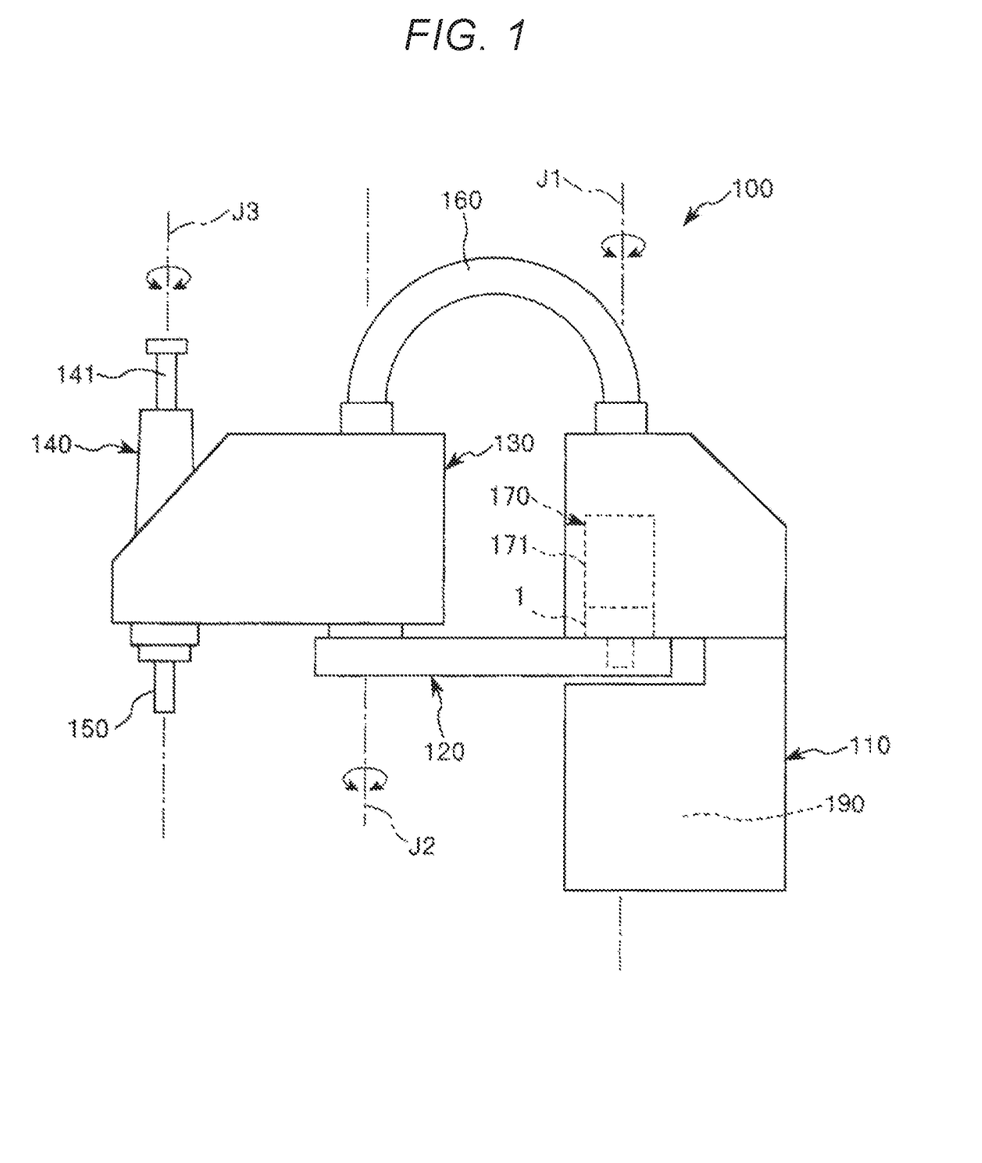
FIG. 1 is a side view showing a schematic configuration of a robot according to an embodiment of the invention.

FIG. 1 is a side view showing a schematic configuration of a robot according to an embodiment of the invention. Hereinafter, for convenience of explanation, the upside in FIG. 1 is referred to as "upper" and the downside is referred to as "lower". Further, the base side in FIG. 1 is referred to as "proximal end side" and the opposite side (end effector side) is referred to as "distal end side". Furthermore, the upward and downward directions in FIG. 1 are referred to as "vertical directions" and the leftward and rightward directions are referred to as "horizontal directions".

A robot 100 shown in FIG. 1 is a robot used for work of feeding, removing, carrying, assembly, etc. of precision apparatuses and components forming the apparatuses (objects). As shown in FIG. 1, the robot 100 has a base 111, a first arm 120, a second arm 130, a work head 140, an end effector 150, a wire routing part 160. As below, the respective parts of the robot 100 will be sequentially and briefly explained.

For example, the base 110 is fixed to a floor surface (not shown) by bolts or the like. A control apparatus 190 for integrated control of the robot 100 is placed inside of the base 110. Further, the first arm 120 is coupled to the base 110 to be rotatable about a first axis J1 (rotation axis) along the vertical direction with respect to the base 110.

Here, a first drive unit 170 is placed within the base 110. The first drive unit 170 has a motor 171 as a first motor such as a servo motor that generates drive power for rotating the first arm 120, and a gear device 1 as a first reducer that decelerates the rotation by the drive power of the motor 171. The input shaft of the gear device 1 is coupled to the rotation shaft of the motor 171 and the output shaft of the gear device 1 is coupled to the first arm 120. Accordingly, when the motor 171 is driven and the drive power is transmitted to the first arm 120 via the gear device 1, the first arm 120 rotates within a horizontal plane about the first axis J1.

The second arm 130 is coupled to the distal end part of the first arm 120 to be rotatable about a second axis J2 (rotation axis) along the vertical direction relative to the first arm 120. A second drive unit (not shown) is set within the second arm 130. The second drive unit has a second motor that generates drive power for rotating the second arm 130 and a second reducer that decelerates the rotation by the drive power of the second motor. Further, the drive power of the second motor is transmitted to the second arm 130 via the second reducer, and thereby, the second arm 130 rotates within a horizontal plane about the second axis J2 relative to the first arm 120.

The work head 140 is placed in the distal end part of the second arm 130. The work head 140 has a spline shaft 141 inserted through a spline nut and a ball screw nut (both not shown) coaxially placed in the distal end part of the second arm 130. The spline shaft 141 is rotatable about an axis J3 thereof relative to the second arm 130 and movable in the upward and downward directions (can rise and fall).

A rotation motor and an elevation motor (not shown) are placed within the second arm 130. The drive power of the rotation motor is transmitted to the spline nut by a drive force transmission mechanism (not shown). When the spline nut rotates forward and backward, the spline shaft 141 rotates forward and backward about the axis J3 along the vertical direction.

On the other hand, the drive force of the elevation motor is transmitted to the ball screw nut by a drive force transmission mechanism (not shown). When the ball screw nut rotates forward and backward, the spline shaft 141 moves upward and downward.

The end effector 150 is coupled to the distal end part (lower end part) of the spline shaft 141. The end effector 150 is not particularly limited, but may be e.g. a member that grasps an object to be carried, a member that processes an object to be processed, or the like.

A plurality of wires connected to the respective electronic components (e.g. the second motor, the rotation motor, the elevation motor, etc.) placed within the second arm 130 are routed into the base 110 through the tubular wire routing part 160 coupling the second arm 130 and the base 110. Further, the plurality of wires are bundled within the base 110, and thereby, routed to the control apparatus 190 placed within the base 110 with wires connected to the motor 171 and an encoder (not shown).

The above described robot 100 has the base 110 as a first member, the first arm 120 as a second member that rotates relative to the base 110, and the gear device 1 that transmits drive force for rotating the first arm 120 relative to the base 110 from one side to the other side of the base 110 and the first arm 120. Note that the structure including the first arm 120 and the second arm 130 may be referred to as "second member". Or, "second member" may include the end effector 150. Further, "rotation" includes motion in both directions including one direction and the opposite direction with respect to a certain center point and rotation with respect to a certain center point.

2. Gear Device

First Embodiment

Figure 2:
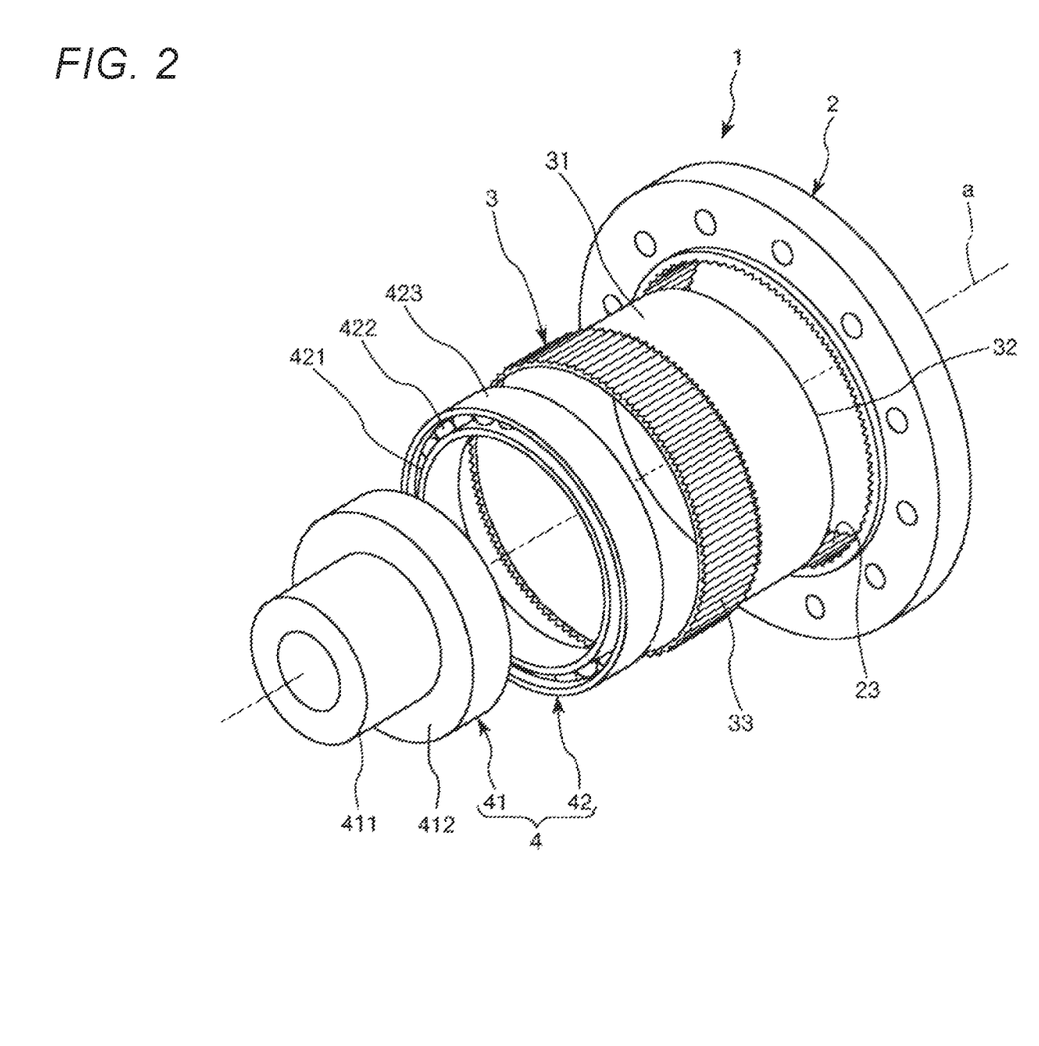
FIG. 2 is an exploded perspective view showing a gear device according to a first embodiment of the invention.
Figure 3:
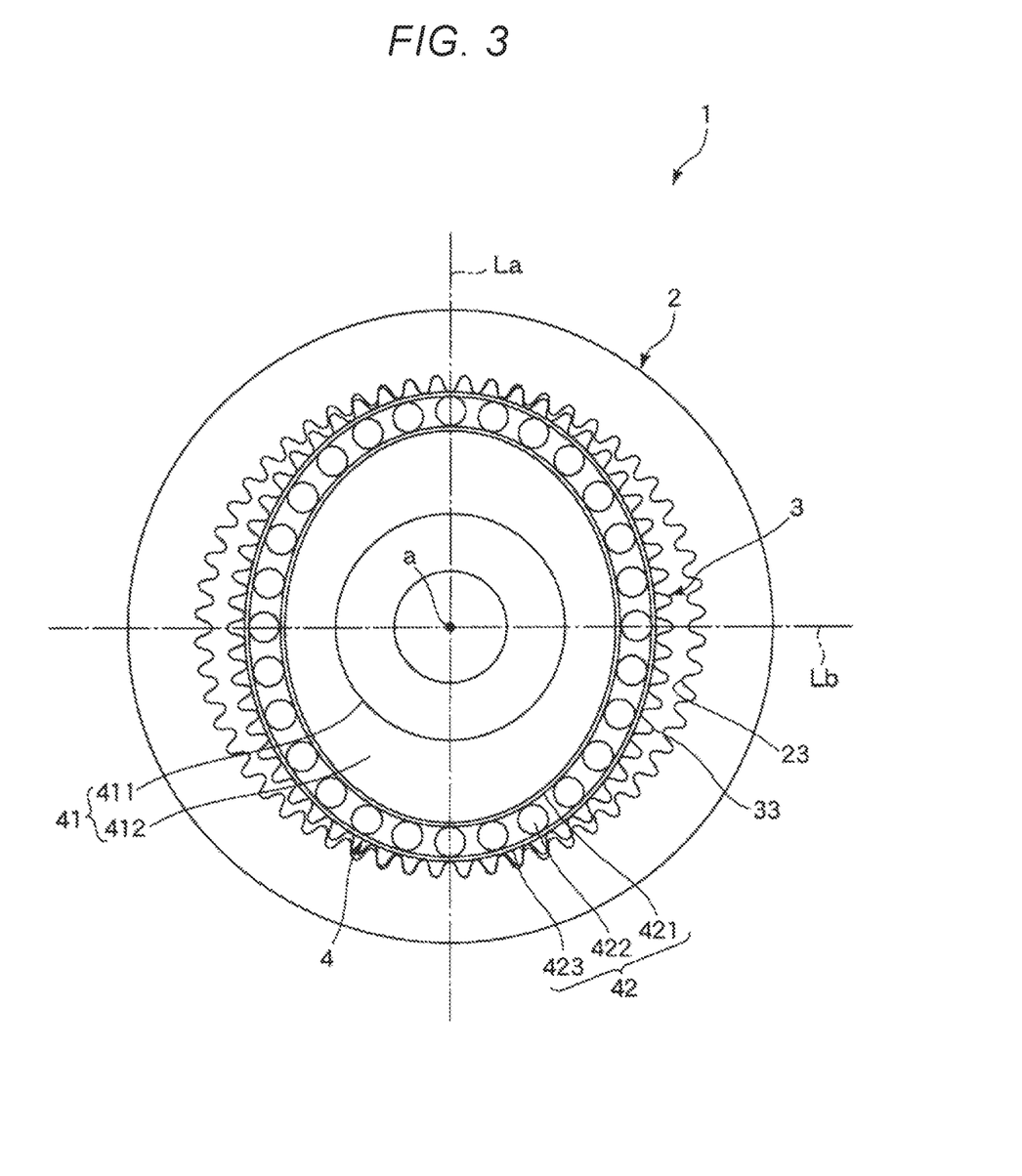
FIG. 3 is a front view (as seen from a direction of an axis line a) of the gear device shown in FIG. 2.
Figure 4:
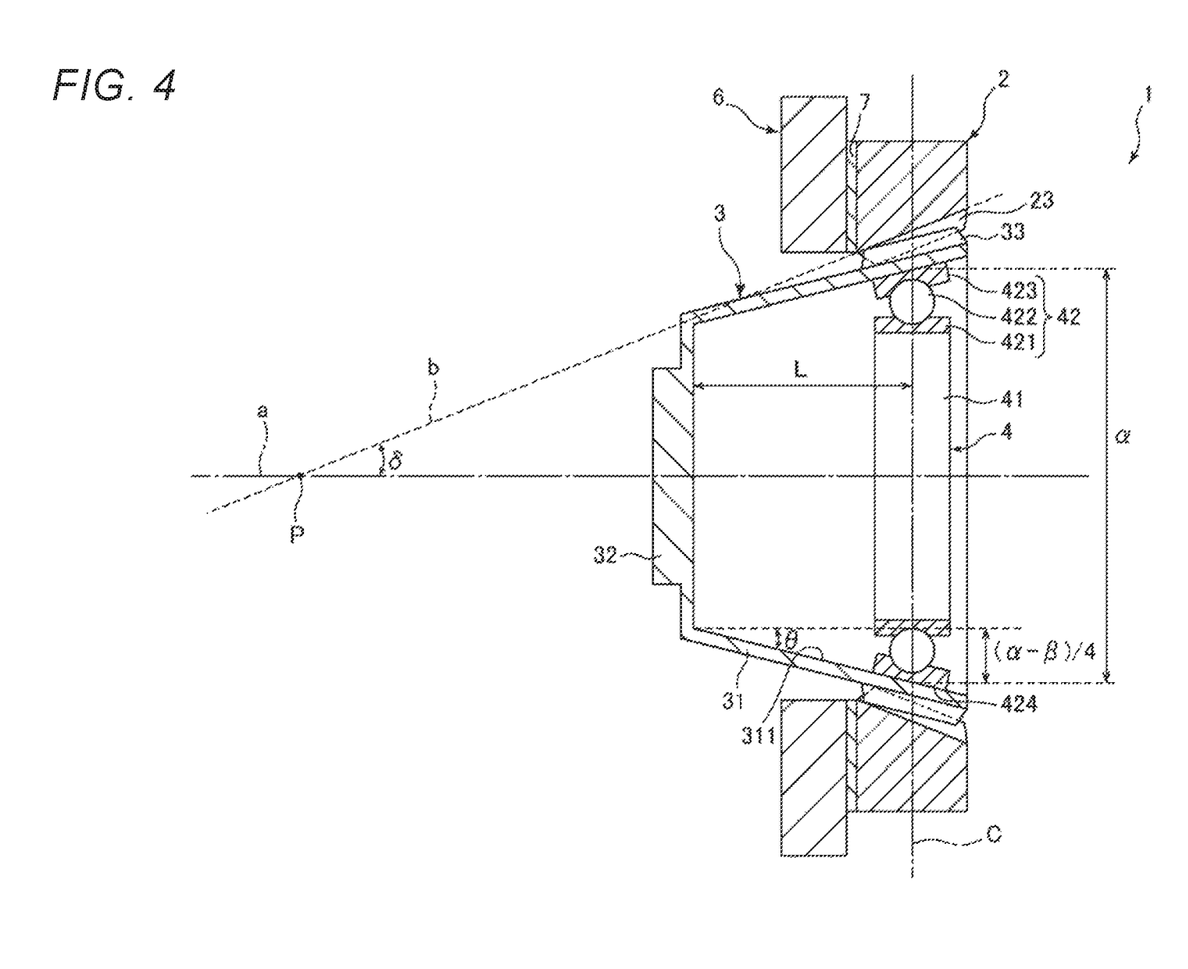
FIG. 4 is a sectional view (cut along a plane containing the axis line a) schematically showing the gear device shown in FIG. 2.
Figure 5:
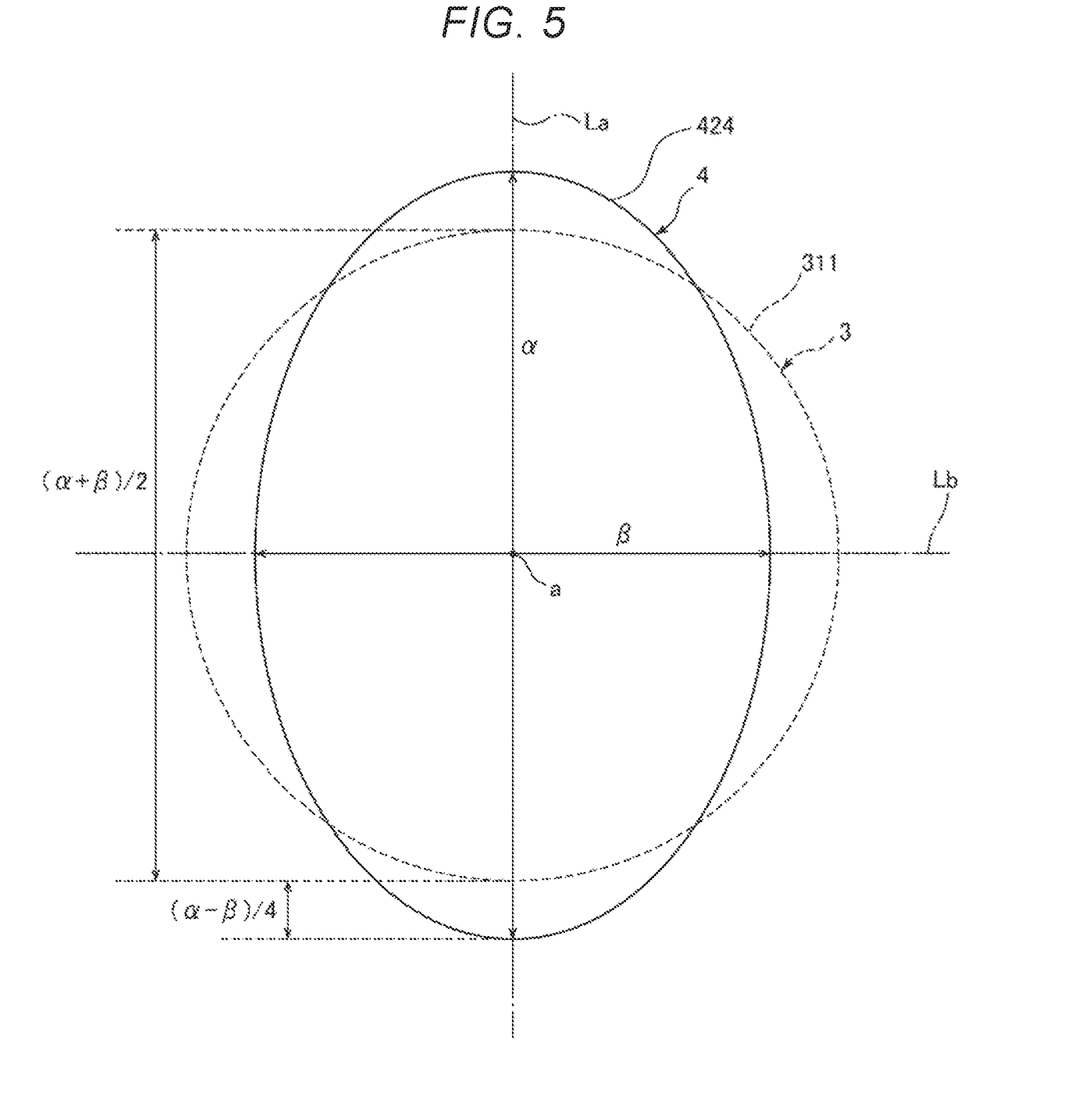
FIG. 5 schematically shows an outer circumferential surface of a wave generator and a state of an inner circumferential surface of an external gear under natural conditions in the gear device shown in FIG. 2.
Figure 6:
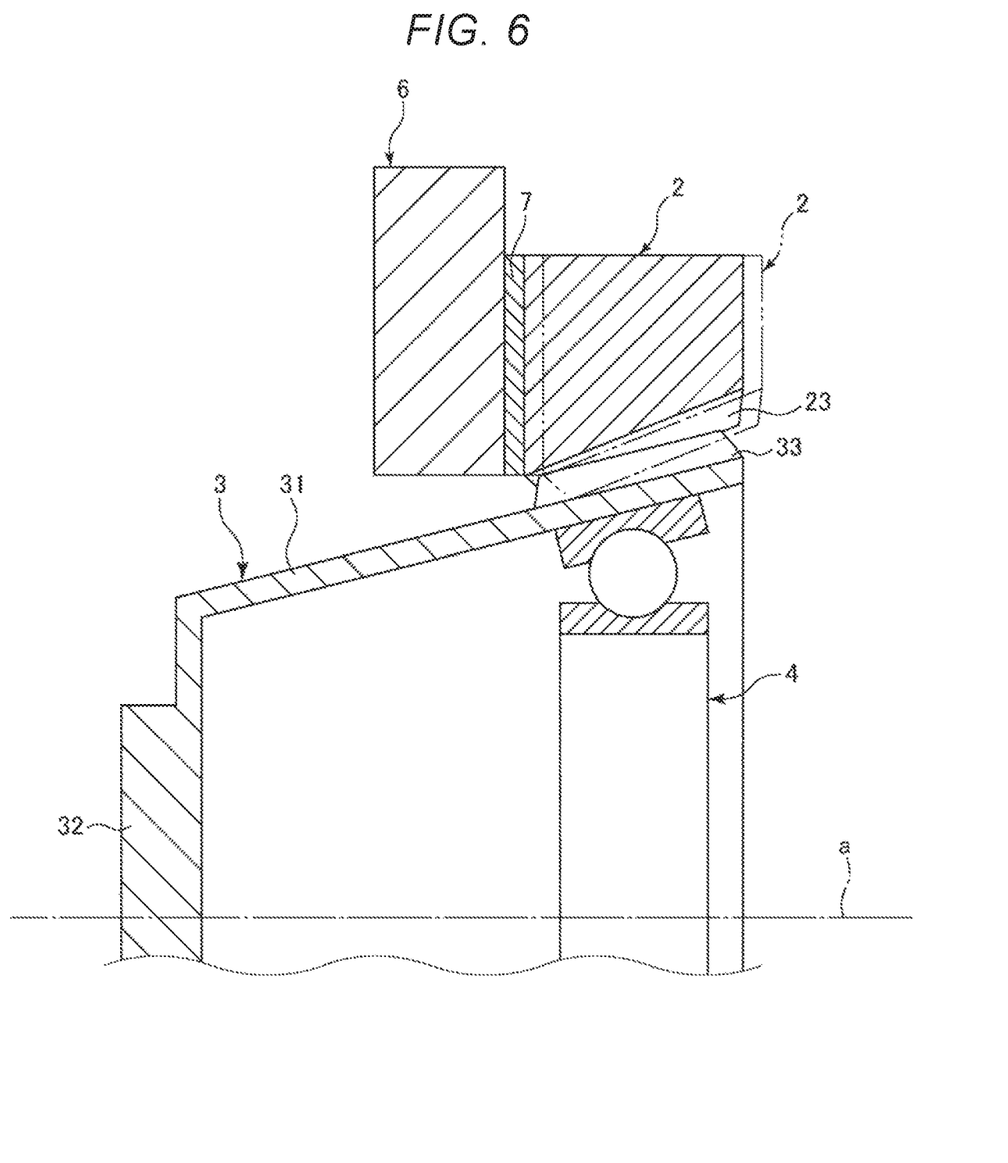
FIG. 6 is an enlarged sectional view for explanation of adjustment of a position of an internal gear in the axis line a direction in the gear device shown in FIG. 2.
Figure 7:
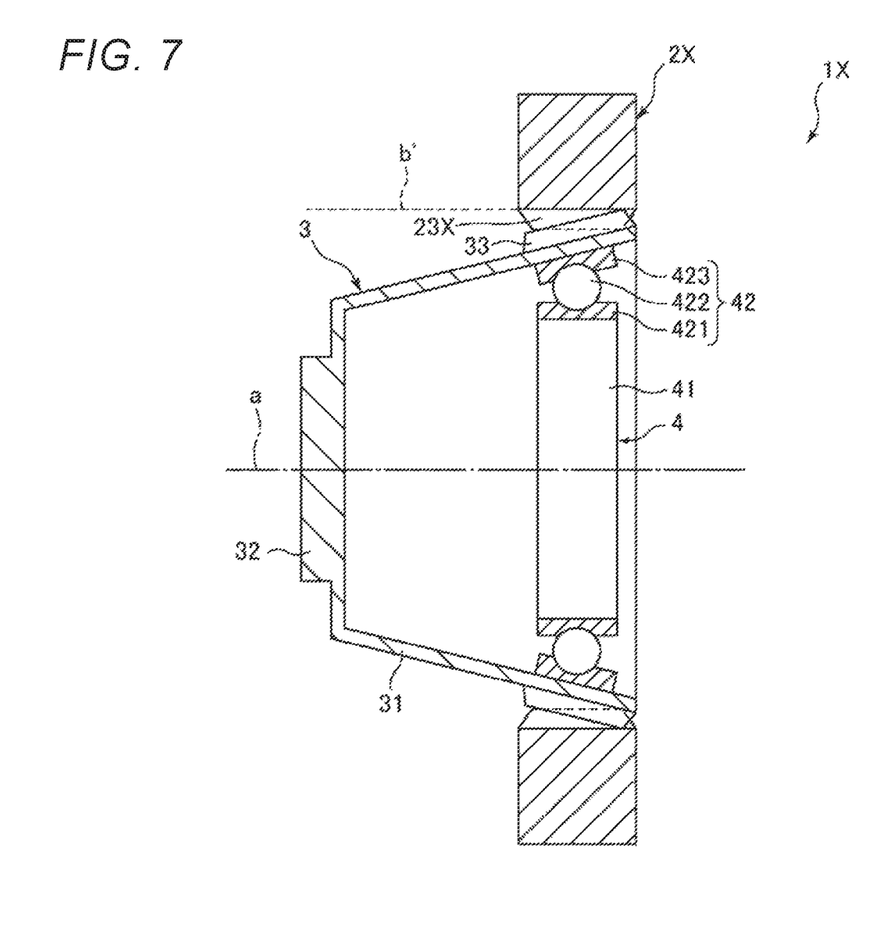
FIG. 7 is a sectional view (cut along the plane containing the axis line a) schematically showing a gear device of related art.

FIG. 2 is an exploded perspective view showing a gear device according to the first embodiment of the invention. FIG. 3 is a front view (as seen from a direction of an axis line a) of the gear device shown in FIG. 2. FIG. 4 is a sectional view (cut along a plane containing the axis line a) schematically showing the gear device shown in FIG. 2. FIG. 5 schematically shows an outer circumferential surface of a wave generator and a state of an inner circumferential surface of an external gear under natural conditions in the gear device shown in FIG. 2. FIG. 6 is an enlarged sectional view for explanation of adjustment of a position of an internal gear in the axis line a direction in the gear device shown in FIG. 2. FIG. 7 is a sectional view (cut along the plane containing the axis line a) schematically showing a gear device of related art. In the respective drawings, for convenience of explanation, the dimensions of the respective parts are appropriately exaggerated as needed and the dimensional ratios between the respective parts are not necessarily the same as the actual dimensional ratios.

The gear device 1 shown in FIGS. 2 to 4 is a wave gear device and used as e.g. a reducer. The gear device 1 has an internal gear 2, a cup-shaped external gear 3 placed inside of the internal gear 2, and a wave generator 4 placed inside of the external gear 3. Further, lubricants such as grease (not shown) are appropriately placed as needed in the respective parts of the gear device 1.

Here, one of the internal gear 2, the external gear 3, and the wave generator 4 is connected to the base 110 (first member) of the above described robot 100 and another one is connected to the first arm 120 (second member) of the above described robot 100. In the embodiment, the internal gear 2 is fixed to the base 110 (first member) and the external gear 3 is connected to the first arm 120 (second member), and the wave generator 4 is connected to the rotation shaft of the motor 171 of the above described robot 100. In the embodiment, as shown in FIG. 4, the internal gear 2 is connected to a member 6 via a spacer 7 and the member 6 is the base 110 or a member connected (fixed) to the base 110.

When the rotation shaft of the motor 171 rotates, the wave generator 4 rotates at the same rotation speed as that of the rotation shaft of the motor 171. Then, the internal gear 2 and the external gear 3 have different numbers of teeth from each other and relatively rotate about the axis line a (rotation axis) due to the difference in number of teeth while meshing positions with each other move in the circumferential direction. In the embodiment, the number of teeth of the internal gear 2 is larger than the number of teeth of the external gear 3, and thereby, the external gear 3 may be rotated at a lower rotation speed than the rotation speed of the rotation shaft of the motor 171. That is, a reducer with the wave generator 4 on the input shaft side and the external gear 3 on the output shaft side may be realized.

Note that the connection form of the internal gear 2, the external gear 3, and the wave generator 4 is not limited to the above described form. For example, in the case where the external gear 3 is fixed to the base 110 and the internal gear 2 is connected to the first arm 120, the gear device 1 may be used as a reducer. Or, in the case where the external gear 3 is connected to the rotation shaft of the motor 171, the gear device 1 may be used as a reducer. In this case, the wave generator 4 may be fixed to the base 110 and the internal gear 2 may be connected to the first arm 120. Or, in the case where the gear device 1 is used as an increaser, that is, the external gear 3 is rotated at a higher rotation speed than the rotation speed of the rotation shaft of the motor 171, the above described relationship between the input side (motor 171 side) and the output side (first arm 120 side) may be reversed.

In the gear device 1, as shown in FIG. 4, a virtual straight line b as an extension of the tooth trace of the internal gear 2 (an extension of the dedendum of an internal tooth 23) in the section cut along the plane containing the axis line a is non-parallel to the axis line a and intersects with the axis line a in a position P. Thereby, the tooth contact strength between the internal gear 2 and the external gear 3 or the like may be adjusted by changing the relative position of the internal gear 2 and the external gear 3 in the direction along the axis line a. Accordingly, good meshing of the internal gear 2 and the external gear 3 may be realized not by excessive increase of the dimensional accuracy of the internal gear 2, the external gear 3, and the wave generator 4. As below, the respective parts of the gear device 1 will be explained.

As shown in FIGS. 2 to 4, the internal gear 2 is a ring-shaped rigid gear having the internal teeth 23 and formed by a rigid body that does not substantially flex in the radial direction.

As shown in FIG. 4, the tooth trace direction of the internal tooth 23 is inclined with respect to the axis line a. Therefore, in the sectional view cut along the plane containing the axis line a, the virtual straight line as the extension of the tooth trace of the internal gear 2 intersects with the axis line a in the position P. In the embodiment, the tooth trace direction of the internal gear 2 is inclined with respect to the axis line a so that the inner diameter of the internal gear 2 may be smaller from the right side toward the left side in FIG. 4. Accordingly, the position P is located on a bottom portion 32 side (the other end part side) of a center C of the tooth width of the internal gear 2. Note that the internal gear 2 may be a spur gear or helical gear and, in either case, the straight line b intersects with the axis line a in the sectional view cut along the plane containing the axis line a.

Here, the internal gear 2 is connected to the base 110 (first member) and the spacer 7 is placed between the internal gear 2 and the member 6 or base 110 (first member). The thickness of the spacer 7 placed as above is changed, and thereby, the relative position of the internal gear 2 and the external gear 3 in the direction along the axis line a may be easily changed. Note that the constituent material of the member 6 is e.g. a metal material or the like and may be the same as the constituent material of the base 110 or not.

The spacer 7 is e.g. a plate-like or sheet-like member and the distance between the internal gear 2 and the member 6 is controlled according to the thickness of the spacer 7. The constituent material of the spacer 7 is not particularly limited, but may be a resin material, metal material, ceramics material, or the like. Among the materials, the metal material or ceramics material is preferably used in view of reduction of fluctuations of the distance between the internal gear 2 and the member 6. Note that the spacer 7 may be formed using a single material or composite material. Or, the spacer 7 may be an adhesive agent containing a gap material.

If a plurality of spacers 7 having different thicknesses are prepared, the spacer 7 placed between the internal gear 2 and the member 6 is replaced by a spacer 7 having a different thickness, and thereby, for example, as shown by dashed-two dotted lines in FIG. 6, the relative position of the internal gear 2 and the external gear 3 in the direction along the axis line a may be changed. Or, the spacer 7 may be formed by a plurality of members, the number of the members placed between the internal gear 2 and the member 6 is changed, and thereby, the relative position of the internal gear 2 and the external gear 3 in the direction along the axis line a may be changed. Note that the spacer 7 is not necessarily placed between the internal gear 2 and the member 6 and, in this case, the distance between the internal gear 2 and the member 6 is the shortest.

Here, the fastening method of the internal gear 2 and the member 6 is not particularly limited, but e.g. screwing or the like may be used. In the case where the fastening method of the internal gear 2 and the member 6 is screwing, the spacer 7 may be fastened together with the internal gear 2 and the member 6 and, at replacement of the spacer 7 placed between the internal gear 2 and the member 6 or the like, screws for fastening the internal gear 2 and the member 6 may be loosened or detached as needed.

The external gear 3 is inserted inside of the internal gear 2. The external gear 3 is a flexible gear flexurally deformable in the radial direction with external teeth 33 (teeth) to mesh with the internal teeth 23 of the internal gear 2. Further, the number of teeth of the external gear 3 is smaller than the number of teeth of the internal gear 2. As described above, the numbers of teeth of the external gear 3 and the internal gear 2 are different from each other, and thereby, a reducer may be realized.

In the embodiment, the external gear 3 has a cup shape with the external teeth 33 formed on the outer circumferential surface thereof. Here, the external gear 3 has a tubular barrel portion 31 opening in one end part (the right end part shown in FIG. 4) and the bottom portion 32 as an attachment portion extending from the other end part (the left end part shown in FIG. 4) of the barrel portion 31 in the radial direction (in the inward radial direction in the embodiment). The barrel portion 31 has the external teeth 33 to mesh with the internal gear 2 around the axis line a. A shaft body on the output side (e.g. the rotation shaft of the motor 171) is attached to the bottom portion 32 by screwing or the like.

As shown in FIG. 3, the wave generator 4 is placed inside of the external gear 3 and rotatable about the axis line a. Further, the wave generator 4 deforms the cross-sectional surface of the barrel portion 31 of the external gear 3 into an elliptical shape or oval shape having a long axis La and a short axis Lb and allows the external teeth 33 to mesh with the internal teeth 23 of the internal gear 2. Here, the external gear 3 and the internal gear 2 mesh with each other rotatably about the same axis line a internally and externally.

In the embodiment, the wave generator 4 has a cam 41 and a bearing 42 attached to the outer circumference of the cam 41. The cam 41 has a shaft portion 411 rotating about the axis line a and a cam portion 412 projecting outward from one end part of the shaft portion 411. Here, the outer circumferential surface of the cam portion 412 has an elliptical shape or oval shape with the long axis La along the upward and downward directions in FIG. 3 as seen from the direction along the axis line a. The bearing 42 has a flexible inner ring 421 and outer ring 423 and a plurality of balls 422 provided between the rings.

As shown in FIG. 4, the inner ring 421 is fitted with the outer circumferential surface of the cam portion 412 of the cam 41 and elastically deforms into an elliptical shape or oval shape along the outer circumferential surface of the cam portion 412. With the deformation, the outer ring 423 also elastically deforms into an elliptical shape or oval shape. An outer circumferential surface 424 of the outer ring 423 is in contact with an inner circumferential surface 311 of the barrel portion 31. Further, the outer circumferential surface of the inner ring 421 and the inner circumferential surface of the outer ring 423 respectively serve as orbital planes that guide and roll the plurality of balls 422 along the circumferential direction. Furthermore, the plurality of balls 422 are held by a holder (not shown) to keep the distances between each other constant in the circumferential direction.

In the wave generator 4, the direction of the cam portion 412 (the direction of the long axis La) changes with the rotation of the cam 41 about the axis line a, and accordingly, the outer ring 423 also deforms and the meshing positions of the internal gear 2 and the external gear 3 with each other are moved in the circumferential direction. Note that, in this regard, the inner ring 421 is fixedly placed on the outer circumferential surface of the cam portion 412 and the deformation state is unchanged.

As described above, the wave generator 4 has an elliptical outer circumferential surface 424 in contact with the inner circumferential surface 311 of the external gear 3. Here, as shown in FIG. 5, letting the length of the outer circumferential surface 424 in the long axis La direction be $\alpha$ [mm], the length of the outer circumferential surface 424 in the short axis Lb direction be $\beta$ [mm], and, as shown in FIG. 4, letting an angle formed by the straight line b and the axis line a (rotation axis) in the sectional view cut along the plane containing the axis line a (rotation axis) be $\delta$ [degrees] and a distance between the bottom portion 32 (attachment portion) and the center C of the tooth width of the internal gear 2 in the direction along the axis line a be L [mm], it is preferable that a relationship $\mathrm{atan}((\alpha-\beta)/4L)-0.6 \leq \delta$ atan $((\alpha-\beta)/4L)+0.6$ is satisfied. Thereby, the meshing lengths of the internal gear 2 and the external gear 3 may be made longer. Further, when the relative position of the internal gear 2 and the external gear 3 in the direction along the axis line a is changed, the change of the meshing lengths of the internal gear 2 and the external gear 3 may be made smaller.

Note that, letting the inclination angle (taper angle) of the barrel portion 31 relative to the axis line a when the external gear 3 is cut along the plane containing the axis a and the long axis La be $\theta$, a relationship $\theta=\mathrm{atan}((\alpha-\beta)/4L)$ is satisfied. Further, in FIG. 5, the natural state of the inner circumferential surface 311 of the external gear 3 (the state in which the wave generator 4 is not attached and no external force is applied) is shown by a chain line. The diameter of the inner circumferential surface 311 in the natural state is $(\alpha+\beta)/2$.

The angle $\delta$ formed by the straight line b and the axis line a (rotation axis) in the sectional view cut along the plane containing the axis line a (rotation axis) is not particularly limited as long as the angle is larger than 0 degrees. However, the angle is preferably within a range from 0.01 degrees to 0.6 degrees, more preferably within a range from 0.01 degrees to 0.3 degrees, and even more preferably within a range from 0.1 degrees to 0.3 degrees. Thereby, the relative position of the internal gear 2 and the external gear 3 in the direction along the axis line a may be changed easily and highly accurately. For example, in the case where the tooth width of the internal gear 2 is 5 mm, if the angle $\delta$ is within the range from 0.01 degrees to 0.6 degrees, the relative position of the internal gear 2 and the external gear 3 in the direction along the axis line a is changed by 1 mm, and thereby, the meshing dimensions of the gears can be adjusted within a range from about 0.2 μm to 10 μm. Therefore, in this case, the thickness of the spacer 7 may be set within a range from about 0.2 μm to 10 μm.

If the angle $\delta$ is too small, it is difficult to secure the necessary width of adjustment of the tooth contact strength between the gears or the like unless the dimensions of the internal gear 2 and the external gear 3 in the direction along the axis line a are increased. On the other hand, if the angle $\delta$ is too large, it is difficult to increase the meshing lengths of the internal gear 2 and the external gear 3 and the durability of the gear device 1 tends to be lower.

As described above, the gear device 1 has the internal gear 2, the flexible external gear 3 partially meshing with the internal gear 2 and relatively rotating about the axis line a (rotation axis) relative to the internal gear 2, and the wave generator 4 being in contact with the inner circumferential surface 311 of the external gear 3 and moving the meshing positions of the internal gear 2 and the external gear 3 in the circumferential direction about the axis line a.

Further, in the section cut along the plane containing the axis line a (rotation axis), the virtual straight line b as the extension of the tooth trace of the internal gear 2 intersects with the axis line a in the position P. Thereby, the tooth contact strength between the internal gear 2 and the external gear 3 or the like may be adjusted by changing the relative position of the internal gear 2 and the external gear 3 in the direction along the axis line a. Accordingly, even when the dimension varies in the internal gear 2 or external gear 3, a desired tooth contact strength between the internal gear 2 and the external gear 3 or the like may be obtained. Thereby, it is not necessary to excessively increase the dimensional accuracy of the internal gear 2 and the external gear 3 and, as a result, the cost reduction of the gear device 1 may be realized. Note that the straight line b is a straight line as an extension of the dedendum or addendum of the internal tooth 23.

Here, the external gear 3 has the tubular barrel portion 31 opening in one end part (the right end part shown in FIG. 4) and the bottom portion 32 as the attachment portion extending from the other end part (the left end part shown in FIG. 4) of the barrel portion 31 in the radial direction (in the inward radial direction in the embodiment), and the barrel portion 31 has the external teeth 33 to mesh with the internal gear 2 around the axis line a. In the embodiment, the position P in which the straight line b and the axis line a (rotation axis) intersect is located on the bottom portion 32 side (the other end part side) of the center C of the tooth width of the internal gear 2 in the sectional view cut along the plane containing the axis line a (rotation axis).

As described above, the position P is located on the bottom portion 32 side (the other end part side) of the center C of the tooth width of the internal gear 2, and thereby, the internal tooth 23 of the internal gear 2 and the external tooth 33 of the external gear 3 are inclined toward the same side with respect to the axis line a in the meshing part of the teeth. Accordingly, the meshing length of the internal gear 2 and the external gear 3 may be made longer. In the case where the internal tooth 23 of the internal gear 2 and the external tooth 33 of the external gear 3 are inclined toward the same side with respect to the axis line a in the meshing part of the teeth, compared to the case shown in the second embodiment, which will be described later, when the relative position of the internal gear 2 and the external gear 3 in the direction along the axis line a is changed, the change of the meshing length of the internal gear 2 and the external gear 3 may be made smaller.

On the other hand, as is the case of a gear device 1X of related art shown in FIG. 7, when the tooth trace direction of an internal tooth 23X of an internal gear 2X, i.e., a virtual straight line b' as an extension of the dedendum of the internal tooth 23X is parallel to the axis line a, the tooth contact strength between the internal gear 2X and the external gear 3 or the like is determined by the dimensional accuracy of the internal gear 2X, the external gear 3, and the wave generator 4. Accordingly, in this case, to realize a meshing state with a desired tooth contact strength between the internal gear 2X and the external gear 3 or the like, it is necessary to extremely increase the dimensional accuracy of the internal gear 2X, the external gear 3, and the wave generator 4 and, as a result, the cost increase of the gear device 1X may be caused. Note that the tooth trace direction of the internal tooth 23X of the internal gear 2X is parallel to the axis line a, and thus, even when the relative position of the internal gear 2X and the external gear 3 in the direction along the axis line a is changed, the tooth contact strength between the internal gear 2X and the external gear 3 is basically unchanged.

Second Embodiment

Figure 8:
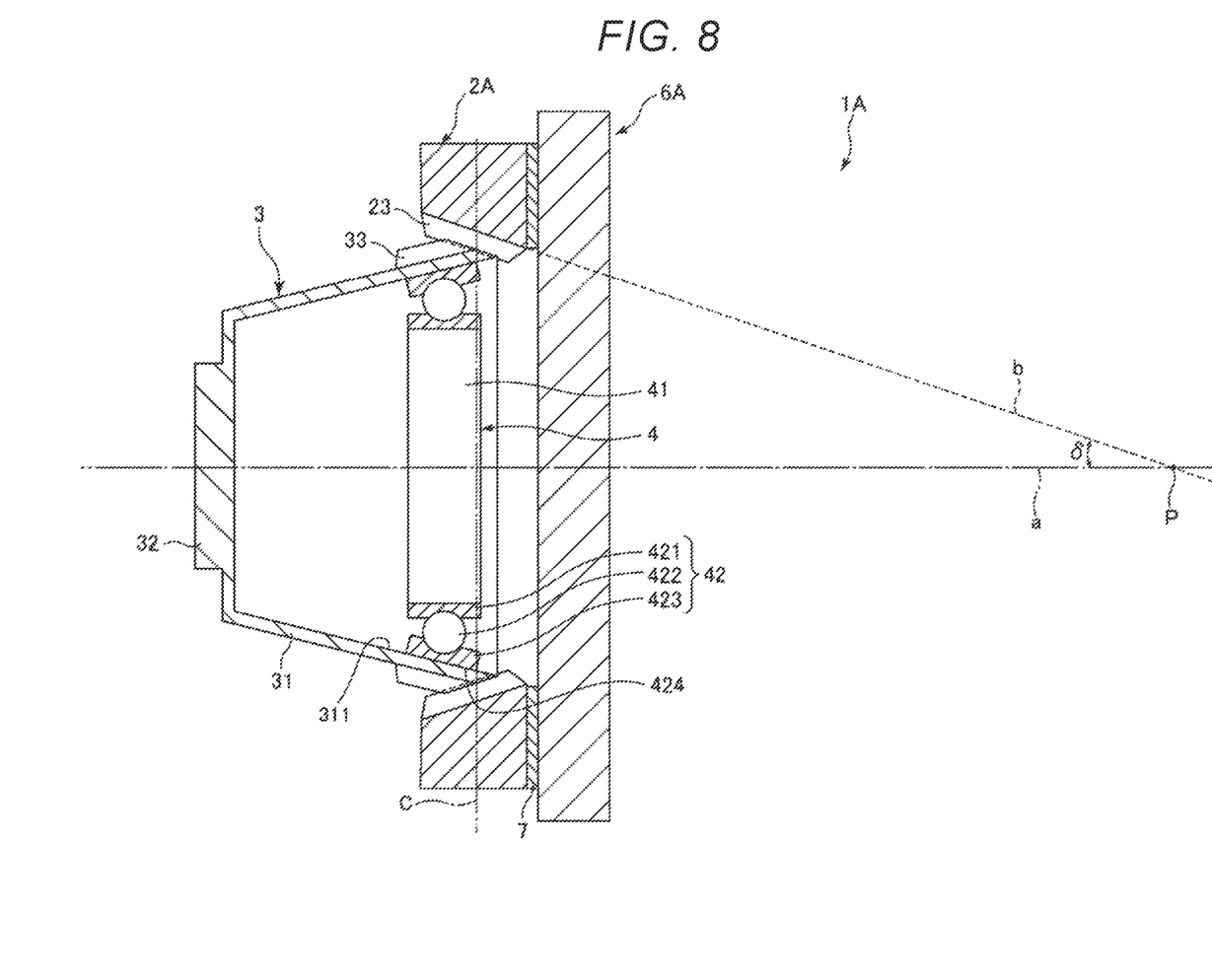
FIG. 8 is a sectional view (cut along the plane containing the axis line a) schematically showing a gear device according to a second embodiment of the invention.

FIG. 8 is a sectional view (cut along the plane containing the axis line a) schematically showing a gear device according to the second embodiment of the invention.

The embodiment is the same as the above described first embodiment except that the configuration and the attachment of the internal gear are different. Note that, in the following description, the embodiment will be explained with a focus on the differences from the above described embodiment and the explanation of the same items will be omitted. Further, in FIG. 8, the same configurations as those of the above described embodiment have the same signs.

A gear device 1A shown in FIG. 8 has an internal gear 2A, the external gear 3 partially meshing with the internal gear 2A and relatively rotating about the axis line a (rotation axis) relative to the internal gear 2A, and the wave generator 4 being in contact with the inner circumferential surface 311 of the external gear 3 and moving the meshing positions of the internal gear 2 and the external gear 3 in the circumferential direction about the axis line a.

In the embodiment, the tooth trace direction of the internal gear 2A is inclined with respect to the axis line a so that the inner diameter of the internal gear 2A may be smaller from the left side toward the right side in FIG. 8. Here, the external gear 3 has the tubular barrel portion 31 opening in one end part (the right end part shown in FIG. 8) and the bottom portion 32 as the attachment portion extending from the other end part (the left end part shown in FIG. 8) of the barrel portion 31 in the radial direction (in the inward radial direction in the embodiment), and the barrel portion 31 has the external teeth 33 to mesh with the internal gear 2 around the axis line a. Further, the position P in which the straight line b and the axis line a intersect is located on the opposite side (one end part side) to the bottom portion 32 of the center C of the tooth width of the internal gear 2A in the sectional view cut along the plane containing the axis line a (rotation axis). Thereby, as shown in FIG. 8, in the case where a member 6A for attachment of the internal gear 2A is placed on the opposite side to the bottom portion 32 with respect to the internal gear 2A, the relative position of the internal gear 2A and the external gear 3 in the direction along the axis line a may be easily changed.

Note that the internal gear 2A is connected to the member 6A via the spacer 7, and the member 6A is the base 110 or a member connected (fixed) to the base 110.

It is preferable that the external tooth 33 of the external gear 3 has a portion inclined toward the same side as the tooth trace direction of the internal tooth 23 with respect to the axis line a in the meshing part with the internal tooth 23 of the internal gear 2A. Thereby, the meshing length of the internal gear 2A and the external gear 3 may be made longer.

According to the above described second embodiment, the same advantages as those of the above described first embodiment may be offered.

As above, the robot and gear device according to the invention are explained based on the illustrated embodiments, however, the invention is not limited to those. The configurations of the respective parts may be replaced by arbitrary configurations having the same functions. Further, another arbitrary configuration may be added to the invention.

In the above described embodiments, the horizontal articulated robot is explained, however, the invention is not limited to that. For example, the number of joints of the robot is arbitrary, and the invention can be applied to a vertical articulated robot.

In the above described embodiments, the case where the external gear of the gear device has the cup shape (the tubular shape with the bottom) is explained as an example, however, the invention is not limited to that. For example, the external gear may have a hat shape (a tubular shape with a flange). When the external gear has the hat shape, the external gear has a flange portion extending from the other end part of the barrel portion outward in the radial direction as an attachment portion.

The entire disclosure of Japanese Patent Application No. 2018-023780, filed Feb. 14, 2018 is expressly incorporated by reference herein.

What is claimed is:

1. A robot comprising:
   a first member;
   a second member that rotates relative to the first member; and
   a gear device that transmits drive power for rotating the second member relative to the first member from one side to the other side of the first member and the second member,
   the gear device having
   an internal gear,
   an external gear partially meshing with the internal gear, relatively rotating around a rotation axis to the internal gear, and having flexibility, and
   a wave generator being in contact with an inner circumferential surface of the external gear and moving a meshing position of the internal gear and the external gear in a circumferential direction about the rotation axis,
   wherein one of the internal gear, the external gear, and the wave generator is connected to the first member and another one is connected to the second member, and
   a virtual straight line as an extension of a tooth trace of the internal gear intersects with the rotation axis in a sectional view cut along a plane containing the rotation axis.

2. The robot according to claim 1, wherein the external gear has:
   a tubular barrel portion having external teeth to mesh with the internal gear and opening in one end part around the rotation axis; and
   an attachment portion extending from the other end part of the barrel portion in a radial direction, and
   a position in which the straight line and the rotation axis intersect is on the one end part side of a center of a tooth width of the internal gear in the sectional view.

3. The robot according to claim 1, wherein the external gear has:
   a tubular barrel portion having external teeth to mesh with the internal gear and opening in one end part around the rotation axis; and
   an attachment portion extending from the other end part of the barrel portion in a radial direction, and
   a position in which the straight line and the rotation axis intersect is on the other end part side of a center of a tooth width of the internal gear in the sectional view.

4. The robot according to claim 2, wherein the wave generator has an elliptical outer circumferential surface in contact with an inner circumferential surface of the external gear, and letting a length of the outer circumferential surface in a long axis direction be α [mm], a length of the outer circumferential surface in a short axis direction β [mm], an angle formed by the straight line and the rotation axis in the sectional view be δ [degrees], and a distance between the attachment portion and the center of the tooth width of the internal gear in the direction along the rotation axis be L [mm], a relationship atan((α−β)/4L)−0.6≤δ atan((α−β)/4L)+0.6 is satisfied.

5. The robot according to claim 1, wherein the internal gear is connected to the first member, and a spacer is placed between the internal gear and the first member.

6. The robot according to claim 1, wherein an angle formed by the straight line and the rotation axis in the sectional view is within a range from 0.01 degrees to 0.6 degrees.

* * * * *